United States Patent
Hirayama

(10) Patent No.: US 6,394,381 B1
(45) Date of Patent: May 28, 2002

(54) DUAL-BEARING REEL CENTRIFUGAL BRAKING DEVICE

(75) Inventor: Hirokazu Hirayama, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/635,842

(22) Filed: Aug. 11, 2000

(30) Foreign Application Priority Data

Aug. 13, 1999 (JP) .......................................... 11-229149

(51) Int. Cl.[7] ............................................... A01K 89/02
(52) U.S. Cl. .................................... 242/289; 188/181 A
(58) Field of Search ............................... 242/288, 289; 188/181 A, 185

(56) References Cited

U.S. PATENT DOCUMENTS

| | | | | |
|---|---|---|---|---|
| 5,356,090 A | * | 10/1994 | Sato | 242/289 |
| 5,362,011 A | * | 11/1994 | Sato | 242/289 |
| 5,372,324 A | * | 12/1994 | Sato | 242/289 |
| 5,393,005 A | * | 2/1995 | Nakajima | 242/289 |
| 5,577,680 A | * | 11/1996 | Ikuta | 242/288 |
| 5,782,420 A | * | 7/1998 | Forslund | 242/289 |
| 5,803,385 A | * | 9/1998 | Baisch | 242/289 |
| 5,865,387 A | * | 2/1999 | Hirano | 242/289 |
| 5,934,588 A | * | 8/1999 | Ylikangas | 242/289 |
| 5,984,221 A | * | 11/1999 | Kim | 242/289 |
| 6,003,798 A | * | 12/1999 | Kim | 242/289 |
| 6,168,106 B1 | * | 1/2001 | Cockerham | 242/289 |
| 6,254,021 B1 | * | 7/2001 | Morimoto et al. | 242/289 |

* cited by examiner

*Primary Examiner*—Emmanuel M. Marcelo
(74) *Attorney, Agent, or Firm*—Shinjyu Global IP Counselors, LLP

(57) ABSTRACT

A centrifugal braking device switchable between inoperative and operative states enabling the switching operation to be carried out with light force. The centrifugal braking mechanism in a dual-bearing reel unit is for braking the spool under centrifugal force, and includes a plurality of guide shafts, a plurality of shifters, a cylindrical brake element, and a switching mechanism. The guide shafts are radially disposed on a rotor coupled to the spool for rotation together therewith. The shifters are axially movably fitted to the guide shafts, about which they are pivotable, and therein allowed travel diametrically with respect to the spool. The brake element is disposed to the outer peripheral side of the plurality of shifters, and made non-rotatable with respect to the reel unit. The shifters travel diametrically under centrifugal force to come into contact with the brake element. By changing the pivotal position of the shifters about the shaft, the switching mechanism switches the shifters between an inoperative state, preventing them from coming into contact with the brake element, and an operative state enabling brake element contact.

13 Claims, 12 Drawing Sheets

DUAL-BEARING REEL CENTRIFUGAL BRAKING DEVICE

BACKGROUND OF THE INVENTION

1. Technical Field

The present invention relates to reel-braking devices; in particular to dual-bearing reel centrifugal braking devices for braking under centrifugal force the spool fitted rotatively to the reel unit.

2. Description of Related Art

In dual-bearing reels referred to as bait reels, utilized mainly for lure fishing, generally braking force is made to act on the spool so that backlash does not occur when casting. "Backlash" herein is the phenomenon of the rotational speed of the spool being faster than the line wind-out speed. As this type of braking mechanism, centrifugal braking devices that employ centrifugal force developing from spool rotation to brake the spool are known.

Centrifugal braking mechanisms of this class are in general provided with: shifters allowed to shift in the diametric direction of the spool (guide shaft axial direction) on guide shafts that are arranged radially on a rotor that rotates coupled with the spool; and a brake element to the outer peripheral side of the shifters, provided enabling shifter contact. Among these sorts of centrifugal braking devices, that disclosed in Japanese Utility Model Gazette Reg. No. 2535505 enables adjusting the number of shifters that can come into contact the brake element.

The centrifugal braking device disclosed in the above-noted gazette is provided with a switching mechanism that by translating the shifters diametrically with respect to the spool switches between an inoperative state in which the shifters cannot come into contact with the brake element and an operative state for contact with the brake element. The switching mechanism includes pairs of fixing projections formed projecting toward the shifters on lateral walls of recesses formed in a shifter-fitting section of the rotor, and annular shifter projections that enable interlocking with the fixing projections and that are furnished on the shifters. The shifter projections, or the fixing projections, are elastically deformable components and by elastic deformation enable disengagement of the interlocking.

Wherein switching between the operative state and the inoperative state is carried out, the annular shifter projections on the shifters are caught and pulled with the fingertips to shift the shifters diametrically. Shifting the shifters from the operative state diametrically inward by elastically deforming the shifter projections to carry them past the fixing projections and dispose the shifter projections inward thereof switches them into the inoperative state, in which the shifters cannot come into contact with the brake element. Again, shifting the shifters from the inoperative state diametrically outward to dispose the shifter projections outward switches the shifters into the operative state.

In the foregoing conventional centrifugal braking devices, the shifters are switched between the operative state and the inoperative state by shifting them diametrically with respect to the spool, elastically deforming either the fixing projections or the shifter projections, wherein the shifter projections ride against and beyond the fixing projections. Accordingly, because the shifting directions when switching and when braking the shifters are the same, loosening the interlocked state of the two sets of projections to make handling easier risks that when braking, the shifter projections on the shifters in the inoperative state will ride past the fixing projections and come into contact with the brake element. Therefore, in the foregoing conventional configuration, the interlocked state between the two sets of projections has to be adjusted tight enough to keep the shifter projections from riding past the fixing projections under centrifugal force. In practice, the interlocked state is tightened by making the elastically deformable projections among the two sets of projections harder, or by enlarging the extent of engagement of the two sets of projections. An accordingly tightened engagement makes a comparatively large force necessary for the switching operation, making handling during switching difficult.

SUMMARY OF THE INVENTION

An object of the present invention is to enable the switching operation in a centrifugal braking device switchable between inoperative and operative states to be carried out with light force.

The centrifugal braking device for a dual bearing reel according to aspect 1 of the present invention is a device for braking a spool which is rotatably provided with a reel body by using a centrifugal force, including a plurality of guide shafts, a plurality of shifters, a brake element of a cylindrical shape, and a switching means. The guide shafts are shafts which are radially provided with a rotor which rotates together with the spool. The shifters are members attached to the guide shafts in a movable manner in an axial direction rotatably around the axis. The shifters are capable of moving in a radius direction of the spool. The brake element is a member disposed at an outer peripheral side of the plurality of shifters. The brake element is non-rotatably provided with respect to the reel body and may be made contact with the shifters which are moved in the radius direction. The switching means is a means for switching a state of the shifters to an inoperative state in which no contact with the brake element is possible or to an operative state in which a contact with the brake element is possible by changing a rotational position of the shifters around the axis.

In this centrifugal braking device, when the spool rotates, the rotor also rotates and the shifter attached to the guide shaft moves in the radius direction to make contact with the brake element. When the shifter makes contact with the brake element, the spool is braked by a frictional force. The braking force generated at this time depends on the number of the shifters which make contact with the brake element, and the number of the shifters which make contact is changeable by using the switching means. That is, if the state of the shifter is switched to the inoperative state by using the switching means, the shifter cannot make contact with the brake element. This switching operation may be carried out by changing a rotational position of the shifter around the guide shaft. Since the rotational direction around the guide shaft is different from the moving direction of the shifter (i.e., the axial direction of the guide shaft), a large force is not necessary for the switching operation in the rotary direction and the operation may be carried out by using a small force. Since the switching operation may be carried out with a small force, it may be performed all at once by using another member instead of performing it one by one manually. Moreover, since the operation direction is the rotary direction, not the radius direction of the spool, the switching operation is easily performed all at once.

The centrifugal braking device for a dual bearing reel according to aspect 2 of the present invention is a device as set forth in aspect 1, wherein each of the guide shafts is provided inside of a plurality of recesses which is radially provided around an outer periphery portion of the rotor with an opening facing an outer peripheral side thereof; and the switching means includes: a shifter projection disposed at the shifters so as to project in a radius direction of the guide shafts; a guide provided with one of side walls of the recess which opposed to each other in a rotary direction, the guide being engaged with the shifter projection and non-rotatably guides the shifter to a position at which a contact with the brake element is possible in a manner movable in the axial direction; and a restricter provided with the other one of the side walls, the restricter being engaged with the shifter projection and restricts the shifter so that the shifter cannot make contact with the brake element. In this case, when the shifter projection of the shifter is directed to the guide provided with one of the side walls of the recess, the state of the shifter is switched to the operative state. On the other hand, when the shifter projection is directed to the restricter provided with the other one of the side walls, the state thereof is switched to the inoperative state. For this reason, the direction of the shifter projection is different in the operative state and the inoperative state and, hence, the operative or inoperative state of the shifter can be immediately determined.

The centrifugal braking device for a dual bearing reel according to aspect 3 of the present invention is a device as set forth in aspect 2, wherein the guide includes a first linear engaging portion formed as a protuberance or notch in one of the side walls, the first linear engaging portion extending parallel to the guide shaft with a length by which the shifter is capable of making contact with the brake element in a state in which the shifter projection being engaged; the restricter includes a second linear engaging portion formed as a protuberance or notch in the other one of the side walls, the second linear engaging portion extending parallel to the guide shaft with a length by which the shifter is incapable of making contact with the brake element in a state in which the shifter projection being engaged; and the shifter projection includes a moving engaging portion formed at an end portion of the shifter projection as a protuberance or notch, the moving engaging portion being capable of non-rotatably engaging with the two linear engaging portions in a movable manner in the axial direction. In this case, when the moving engaging portion of the shifter projection is engaged with the first linear engaging portion by rotating the shifter, the state of the shifter is switched to the operative state and the operative state is maintained by a dovetailing engagement so that the shifter may be moved outwardly in the axial direction (outwardly in the radius direction of the spool) to make contact with the brake element when the spool rotates. Also, when it is rotated in the opposite direction to be engaged with the second linear engaging portion, the state of the shifter is switched to the inoperative state and the state is maintained. In the inoperative state, if the shifter is moved in the axial direction towards the brake element, it cannot move to a position at which a contact with the brake element is possible and, hence, it cannot make contact with the brake element. In this case, since the two states are maintained and the movement in the axial direction is restricted by the dovetailing engagement of the two linear engaging portions with the moving engaging portion, it is not necessary to maintain the two states by using another member.

The centrifugal braking device for a dual bearing reel according to aspect 4 of the present invention is a device as set forth in aspect 3, wherein there are two of the shifter projections provided with an interval between each other around an axis of the guide shaft, one of the shifter projections being engaged with the first linear engaging portion and the other one of the shifter projections being engaged with the second linear engaging portion. In this case, the two states may be maintained without using another member and, since the two shifter projections are provided so as to correspond to each state, the degree of rotation may be decreased as compared with a case in which one shifter projection is engaged with one of the two linear engaging portion and, hence, operability thereof is increased.

The centrifugal braking device for a dual bearing reel according to aspect 5 of the present invention is a device as set forth in aspect 4, wherein the two shifter projections are provided with an interval between each other in an axial direction of the guide shaft, one of the shifter projections closer to the brake element being engaged with the first linear engaging portion and the other one of the shifter projections farther from the brake element being engaged with the second linear engaging portion. In this case, the two states may be easily switched by simply rotating the shifter, not by moving it in the axial direction.

The centrifugal braking device for a dual bearing reel according to aspect 6 of the present invention is a device as set forth in aspect 4, wherein the two shifter projections are provided with an interval between each other in an axial direction of the guide shaft, one of the shifter projections closer to the brake element being engaged with the second linear engaging portion and the other one of the shifter projections farther from the brake element being engaged with the first linear engaging portion. In this case, the two states may be easily switched by simply rotating the shifter, not by moving it in the axial direction.

The centrifugal braking device for a dual bearing reel according to aspect 7 of the present invention is a device as set forth in aspect 1, wherein each of the guide shafts is provided inside of recesses of an even number which is radially provided around an outer periphery portion of the rotor with an opening facing an outer peripheral side thereof; and the switching means includes: a first shifter projection disposed at the shifters so as to project in a radius direction of the guide shafts and a second shifter projection provided with an interval from the first shifter in an axial direction of the guide shaft and around the axis; a guide provided with one of a pair of side walls of the even number recesses which opposed to each other in a rotary direction, a continuous half of the guide being engaged with the first shifter projection and the other continuous half of the guide being engaged with the second shifter projection, the guide guides the shifter to a position at which a contact with the brake element is possible in a manner movable in the axial direction; and a restricter provided with the other one of the side walls, a continuous half of the restricter being engaged with the second shifter projection and the other continuous half of the restricter being engaged with the first shifter projection, the restricter restricts the shifter so that the shifter cannot make contact with the brake element. In this case, a continuous half of the guide or the restricter is engaged with one of the two shifter projection, a member for switching operation needs only be rotated a half periphery, not entire periphery, when states of the two shifters are switched at once in sequence.

The centrifugal braking device for a dual bearing reel according to aspect 8 of the present invention is a device as set forth in aspect 7, wherein the guide includes a first channel notch provided with the one of side walls so as to be parallel to the guide shaft; and the restricter includes a second channel notch provided with the other one of side walls so as to be parallel to the guide shaft, the second channel notch having a length by which the shifter cannot make contact with the brake element when the first shifter projection or the second shifter projection makes contact with an end portion thereof. In this case, since the guiding and restriction of the shifters may be carried out by the channel notches, the configuration of the guide and restricter may be realized by using the same structure and, hence, the configuration of the switching means is simplified.

The centrifugal braking device for a dual bearing reel according to aspect 9 of the present invention is a device as set forth in aspect 7 or 8, further having a shifter controlling mechanism which includes: an adjustment member of a circular plate shape capable of relatively rotating around an rotary axis of the spool with respect to the rotor and rotating together with the rotor while maintaining a relative rotary position; a first arc projection of a half arc shape provided with the adjustment member at a position at which the first arc projection being capable of opposing to the first shifter projection, the first arc projection presses a plurality of the first shifter projections disposed at a continuous half of the recesses in order by an end portion thereof when the adjustment member rotates in a direction so that the first shifter projections are engaged, in that order, with the guide to switch a state of the shifter from the inoperative state to the operative state and maintain the operative state of the switched shifter, the first arc projection presses a plurality of the first shifter projections disposed at the other continuous half of the recesses in order by an end portion thereof when the adjustment member rotates in the other direction so that the first shifter projections are engaged, in that order, with the restricter to switch a state of the shifter from the operative state to the inoperative state and maintain the inoperative state of the switched shifter; and a second arc projection of a half arc shape provided with the adjustment member at a position opposite to the first arc projection at which the second arc projection being capable of opposing to the second shifter projection, the second arc projection presses the second shifter projections disposed at the other continuous half of the recesses in order by an end portion thereof when the adjustment member rotates in the direction so that the second shifter projections are engaged, in that order, with the guide to switch a state of the shifter from the inoperative state to the operative state and maintain the operative state of the switched shifter, the second arc projection presses the first shifter projections disposed at the continuous half of the recesses in order by an end portion thereof when the adjustment member rotates in the other direction so that the second shifter projections are engaged, in that order, with the restricter to switch a state of the shifter from the operative state to the inoperative state and maintain the inoperative state of the switched shifter.

In this case, if the adjustment member is rotated in one direction when all of the shifters are in their inoperative states, the first shifter projection of the shifter disposed at the continuous half of the recesses is pressed by the first arc projection to be engaged with the guide in order of pressing so that the shifters of the continuous half are switched to the operative state in order and the operative state is maintained by the first arc projection. At the same time, the second shifter projection of the shifter disposed at the other half of continuous recesses is pressed by the second arc projection to be engaged with the restricter in order of pressing so that the shifters of the other continuous half are switched to the inoperative state in order and the inoperative state is maintained. Also, if the adjustment member is rotated in the other direction when all of the shifters are in their operative states, the second shifter projection of the shifter disposed at the continuous half of the recesses is pressed by the second arc projection to be engaged with the restricter in order of pressing so that the shifters of the continuous half are switched to the inoperative state in order and the inoperative state is maintained. At the same time, the first shifter projection of the shifter disposed at the other half of continuous recesses is pressed by the first arc projection to be engaged with the restricter in order of pressing so that the shifters of the other continuous half are switched to the inoperative state in order and the inoperative state is maintained. At that time, the shifters may be switched to the operative state or the inoperative state in a stepwise manner by staggering a timing of pressing by the first arc projection and that by the second arc projection.

The centrifugal braking device for a dual bearing reel according to aspect 10 of the present invention is a device as set forth in aspect 7 or 8, wherein the guide and restricter maintain the engaged shifter in a non-rotatable state around the guide shaft. In this case, since not only the two shifters are guided and restricted by the guide and the restricter but also the engaged shifters may be maintained in a non-rotatable state, a mechanism for maintaining the state of the shifters becomes unnecessary.

The centrifugal braking device for a dual bearing reel according to aspect 11 of the present invention is a device as set forth in aspect 10, wherein the recesses are disposed at an outer periphery portion of the rotor with an equal interval between each other in a circumferential direction; and further including a shifter controlling mechanism which includes: an adjustment member capable of relatively rotating around an rotary axis of the spool with respect to the rotor and rotating together with the rotor while maintaining a relative rotary position; a first control nub provided with the adjustment member in a protruding manner at a position at which the first control nub being capable of opposing to the first shifter projection, the first control nub presses the first shifter projections disposed at a continuous half of the recesses in order by an end portion thereof when the adjustment member rotates in the direction so that the first shifter projections are engaged, in that order, with the guide; a second control nub provided with the adjustment member at a position located at an upper stream side in the direction with respect to a symmetrical position formed by the first control nub and a spool shaft center and at which the second control nub being capable of opposing to the second shifter projection, the second control nub presses the second shifter projections disposed at the other continuous half of the recesses in order by an end portion thereof when the adjustment member rotates in the direction so that the second shifter projections are engaged, in that order, with the guide; a third control nub provided with the adjustment member at a position located at a downstream side in the direction with respect to the second control nub with the same radius position as the first control nub, the third control nub presses the first shifter projections disposed at the other continuous half of the recesses in order by an end portion thereof when the adjustment member rotates in the other direction so that the first shifter projections are engaged, in that order, with the restricter; and a fourth control nub provided with the adjustment member at a position located at a downstream side in the direction with respect to the first control nub with the same radius position as the second control nub, the fourth control nub presses the second shifter projections disposed at the continuous half of the recesses in order by an end portion thereof when the adjustment member rotates in the other direction so that the second shifter projections are engaged, in that order, with the restricter.

In this case, if the adjustment member is rotated in one direction when all of the shifters are in their inoperative states, the first shifter projection of the shifter disposed at the continuous half of the recesses is pressed by the first control nub to be engaged with the guide in order of pressing so that the shifters of the continuous half are switched to the operative state in order and the operative state is maintained by the guide. At the same time, the second shifter projection of the shifter disposed at the other half of continuous recesses is pressed by the second control nub to be engaged with the guide in order of pressing so that the shifters of the other continuous half are switched to the operative state in order and the operative state is maintained. Also, if the adjustment member is rotated in the other direction when all of the shifters are in their operative states, the first shifter projection of the shifter disposed at the other continuous half of the recesses is pressed by the third control nub to be engaged with the restricter in order of pressing so that the shifters of the other continuous half are switched to the inoperative state in order and the inoperative state is maintained by the restricter. At the same time, the second shifter projection of the shifter disposed at the half of continuous recesses is pressed by the fourth control nub to be engaged with the restricter in order of pressing so that the shifters are switched to the inoperative state in order and the inoperative state is maintained. At that time, the shifters may be switched to the operative state or the inoperative state in a stepwise manner by staggering a timing of pressing by the first control nub and that by the second control nub and a timing of pressing by the third control nub and that by the fourth control nub.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration

Figure 1:
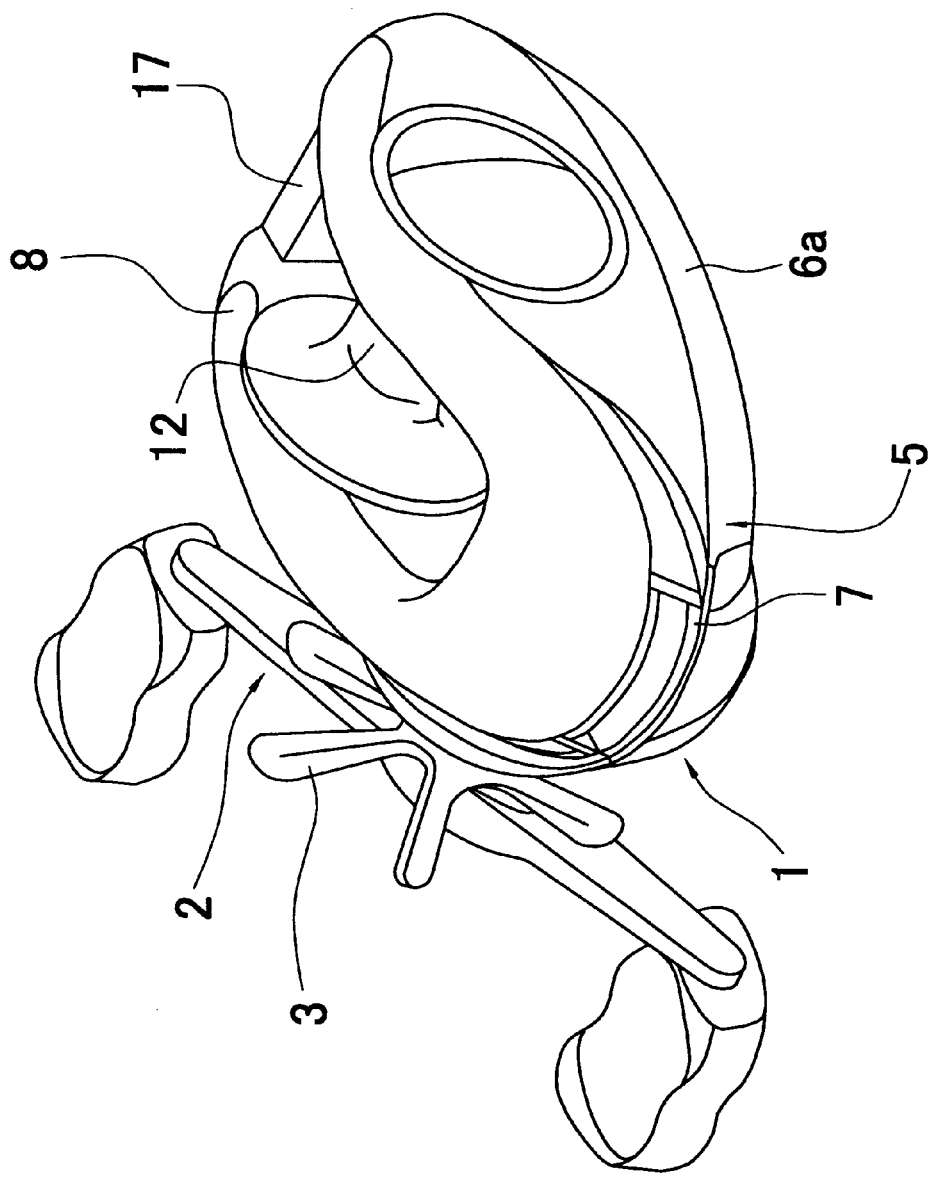
FIG. 1 is a perspective view of a dual bearing reel to which an embodiment of the present invention is applied.

In FIG. 1, a dual bearing reel according to an embodiment of the present invention is a low profile type reel for bait-casting. The reel includes a reel body 1, a handle 2, and a star drag 3 for adjusting drag. The handle 2 is provided for rotating a spool and is disposed at one side of the reel body 1. The star drag 3 is disposed at the reel body 1 side of the handle 2.

Figure 2:
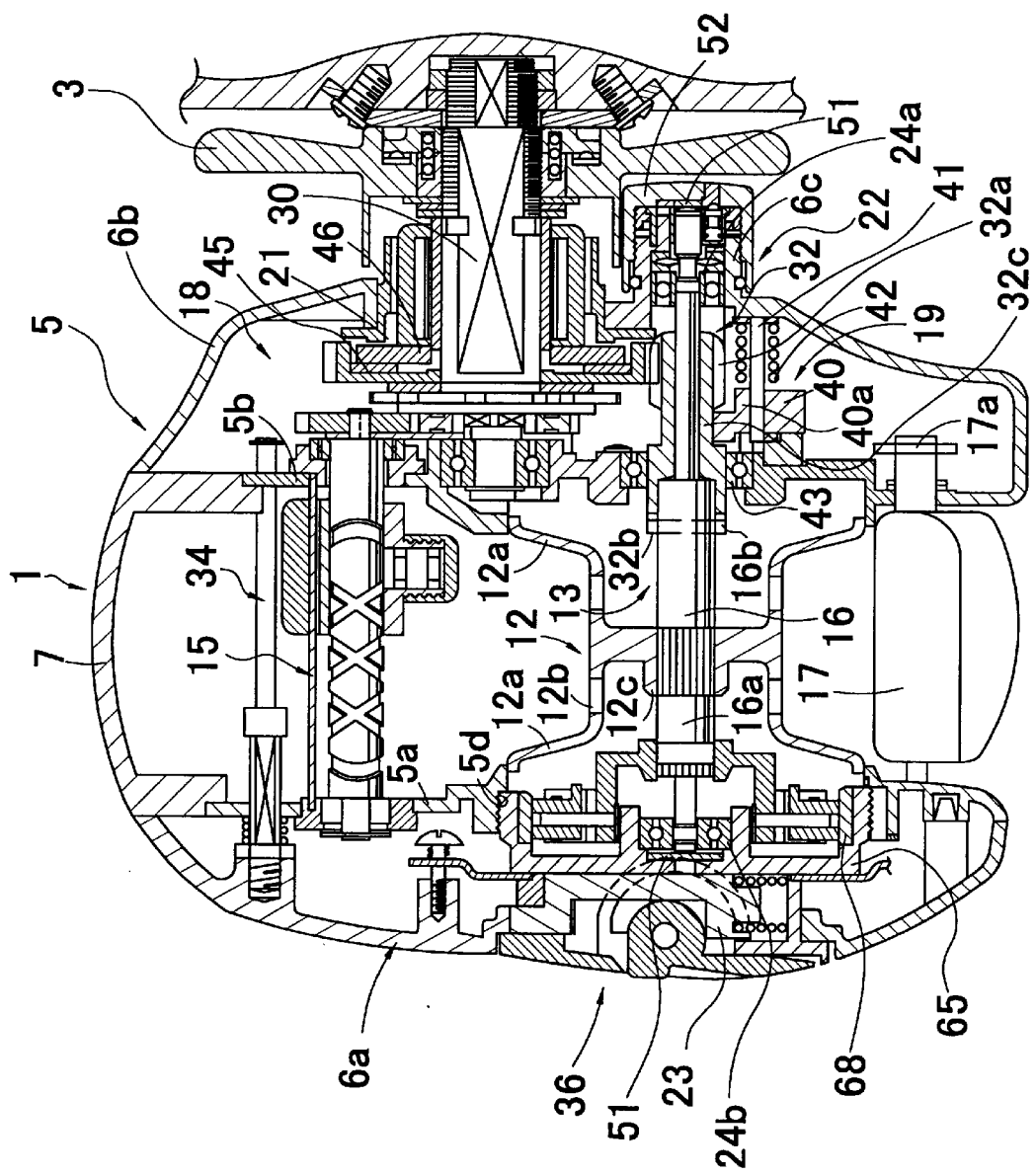
FIG. 2 is its cross-sectional view.

As shown in FIG. 2, the reel body 1 includes a frame 5, a first side-cover 6a, and a second side-cover 6b. The first side-cover 6a and the second side-cover 6b are disposed at a respective side of the frame 5. Also, the reel body 1 includes, as shown in FIG. 1, a front cover 7 for covering the front side and a thumb rest 8 for covering the top. A spool 12 for winding fishing line is rotatably and detachably provided in the reel body 1.

The frame 5 includes a pair of side plates 5a and 5b, which are disposed opposing each other at a predetermined spacing, and a plurality of connecting members (not shown in figures), each of which connects the side plates 5a and 5b.

Figure 3:
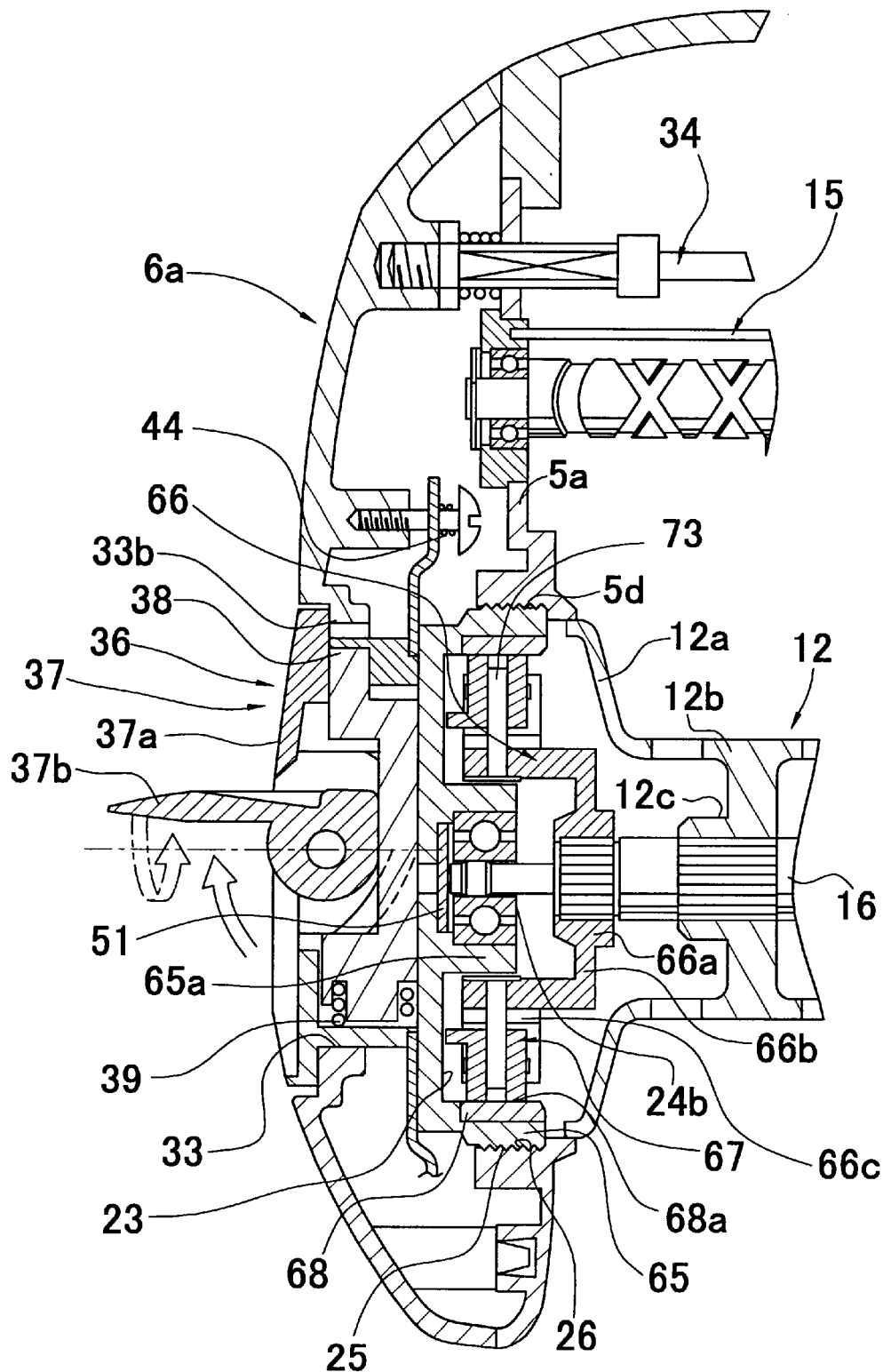
FIG. 3 is an enlarged cross-sectional view of a centrifugal braking mechanism.

The first side-cover 6a is pivotally attached to the frame 5 so as to be opened and closed with respect to the frame 5 so that the spool 12 may be attached and detached. As shown in FIG. 2, the first side-cover 6a includes a pivoting mechanism 34 and a locking mechanism 36 for an opening/closing operation. The pivoting mechanism 34 pivotally supports the first side-cover 6a in a movable manner in a direction away from the frame at a front portion of the frame 5. The locking mechanism 36 is a mechanism for locking or unlocking the first side-cover 6a in its closing state. As shown in FIG. 3, the locking mechanism 36 includes an operation portion 37 which is attached to an opening 33 formed on the first side-cover 6a and a locking member 38 attached to the operation portion 37 in a movable manner in the back and forth directions. The operation portion 37 includes a main portion 37a rotatably attached to the opening 33 in a movable manner in the axial direction and an operation knob 37b pivotally attached to the main portion 37a around an axis in the radius direction.

The main portion 37a is a substantially cylindrical member and urged to a direction approaching to the first side-cover 6a by a coil spring 44. A brake case 65 of a cylindrical shape having a bottom, which is a part of a centrifugal braking mechanism to be described later, is fixed to the main portion 37a by a screw. The brake case 65 is detachably attached to an opening 5d for attaching the spool formed on the side plate 5a by using a screw structure.

The screw structure includes a male screw portion 25 formed on an outer periphery surface of the brake case 65 and a female screw portion 26 which is formed on an inner periphery surface of the opening 5d and engaged with the male screw portion 25.

Figure 5:
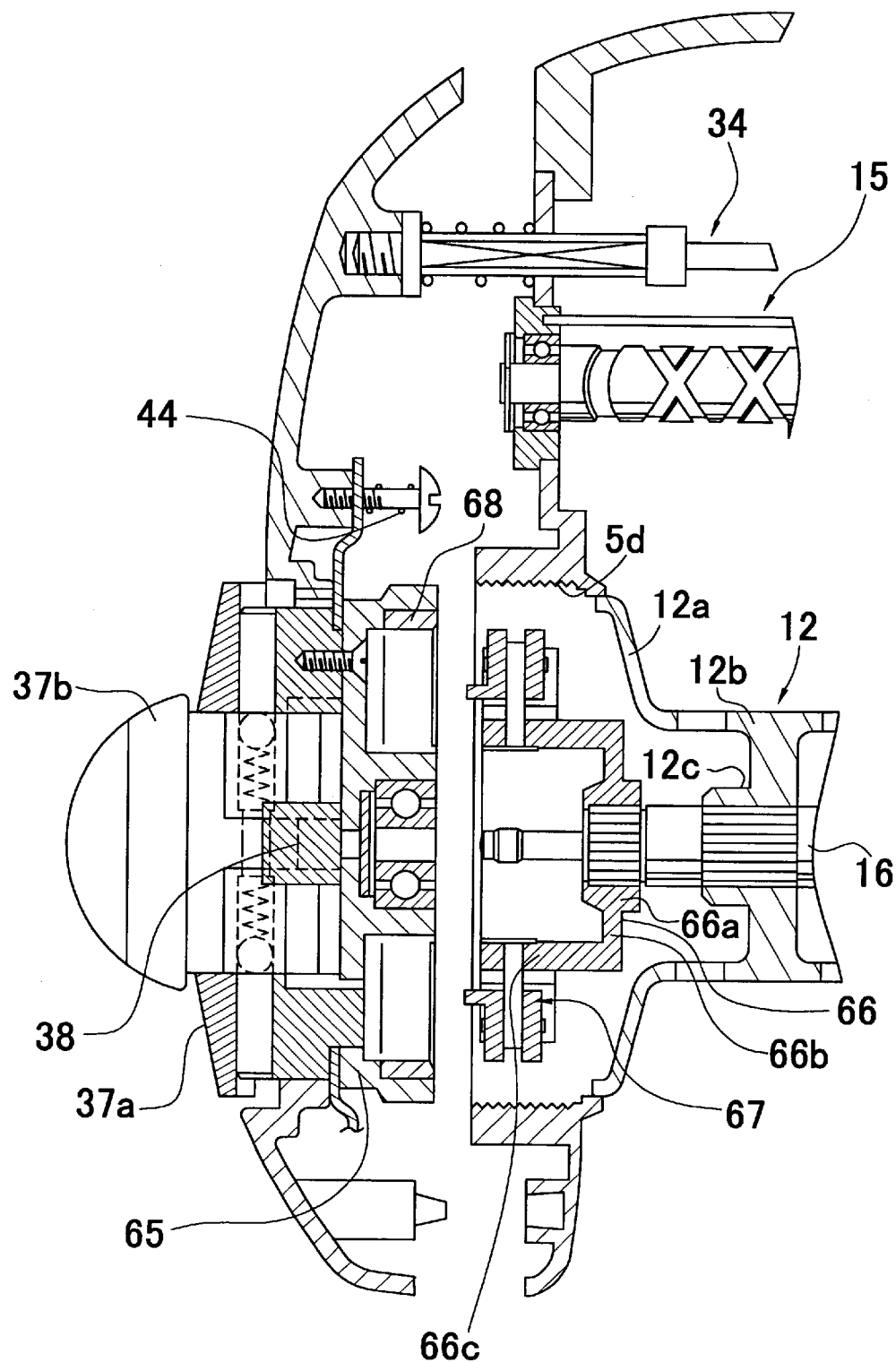
FIG. 5 is a diagram corresponding to FIG. 3 when the first side cover is rotated.

The operation knob 37b is pivotally provided between a locking state in which it is accommodated in the main portion 37a shown in FIG. 2 and a unlocking state in which it projects from the main portion 37a shown in FIG. 5. A part of the operation knob 37b is engaged with the locking member 38.

The locking member 38 is a member for locking the rotation of the main portion 37a so that the first side-cover 6a enters its closing state and does not open. A tip of the locking member 38 may be engaged with any of a plurality of recesses 33b which are formed at the opening 33 with a space between each other in the circumferential direction when it is placed at a locking position shown in FIG. 2. When the locking member 38 is receded to a lock releasing position shown in FIG. 5, the engagement with the recess 33b is disengaged and the main portion 37a enters a rotatable state. The locking member 38 is urged by a coil spring 39 that is attached to the main portion 37a.

As shown in FIG. 2, the spool 12 which is disposed in a direction orthogonal to the fishing rod, a level wind mechanism 15, and a clutch lever 17 are disposed inside the frame 5. The level wind mechanism 15 is provided for uniformly winding fishing line around the spool 12. The clutch lever 17 may function as a thumb rest during a thumbing. A gear mechanism 18, a clutch mechanism 13, a clutch switching mechanism 19, a drag mechanism 21, and a casting control mechanism 22 are disposed in the space between the frame 5 and the second side-cover 6b. The gear mechanism 18 transmits a rotational force from the handle 2 to the spool 12 and the level wind mechanism 15. The clutch switching mechanism 19 switches the clutch mechanism 13 in accordance with the operation of the clutch lever 17. The casting control mechanism 22 adjusts a resistance force generated when the spool 12 rotates. Also, a centrifugal braking mechanism 23 that prevents backlash when casting fishing line is disposed between the frame 5 and the first side-cover 6a.

The spool 12 has flange portions 12a, each of which has a plate shape, at both sides thereof and a spool body 12b of a cylindrical shape is provided between the flange portions 12a. Also, the spool 12 has a boss portion 12c of a cylindrical shape which is integrally formed with the spool body 12b at a substantially center position of the spool body 12b in the axial direction. The spool 12 may be fixed to the spool shaft 16 which penetrates through the boss portion 12c, in a non-rotatable manner by, for instance, a serration engagement. The fixing method is not limited to the serration engagement and various methods such as a key engagement and a spline engagement may be employed. The spool 12 may penetrate the opening 5d on the side plate 5a.

The spool shaft 16 penetrates through the side plate 5b and extends outside the second side-cover 6b. The extended end of the spool shaft 16 is rotatably supported by a bearing 24a of a boss portion 6c which is provided with the second side-cover 6b. Also, a bearing 24b in the centrifugal braking mechanism 23 rotatably supports the other end of the spool shaft 16. The bearings 24a and 24b are shield ball bearings.

The right end of a large diameter portion 16a of the spool shaft 16 is disposed at the penetration portion of the side plate 5b and an engaging pin 16b which forms a part of the clutch mechanism 13 is fixed thereto. The engaging pin 16b penetrates the large diameter portion 16a along the diameter direction and both ends thereof project in the radius directions.

The gear mechanism 18 includes a handle shaft 30, a main gear 31, and a pinion gear 32. The main gear 31 is coupled to a handle shaft 30. The pinion gear 32 has a cylindrical shape and is engaged with the main gear 31. The position of the handle shaft 3 of the gear mechanism 18 is lower than a conventional position in order to lower the height of the thumb rest 8. For this reason, the lower portion of the side plate 5b and that of the second side-cover 6b for accommodating the gear mechanism 18 are positioned lower than the lower portion of the side plate 5a and that of the first side-cover 6a.

As shown in FIG. 2, the pinion gear 32 is a cylindrical member that extends from outside of the side plate 5b to inside thereof and the spool shaft 16 penetrates the center portion thereof. The pinion gear 32 is coupled to the spool shaft 16 in a movable manner in the axial direction. The left end portion (in FIG. 2) of the pinion gear 32 is rotatably supported by a bearing 43 with respect to the side plate 5b in a movable manner in the axial direction. The bearing 43 is also a shield ball bearing.

The pinion gear 32 includes a teeth portion 32a, an engaging portion 32b and a compressed portion 32c. The teeth portion 32a is formed on a right-hand side outer periphery portion in FIG. 2 and engaged with the main gear 31. The engaging portion 32b is formed at the other side. The compressed portion 32c is disposed between the teeth portion 32a and the engaging portion 32b. The engaging portion 32b includes a channel notch formed on an end surface of the pinion gear 32 in the diameter direction and an engaging pin 16b which penetrates the spool shaft 16 and fixed is engaged therewith. In this embodiment, when the engaging portion 32b is disengaged from the engaging pin 16b of the spool shaft 16 as the pinion gear 32 moves outwardly, the rotational force of the handle shaft 30 is not transmitted to the spool 12. The engaging portion 32b and the engaging pin 16b constitute the clutch mechanism 13. When the engaging pin 16b is engaged with the engaging portion 32b, twisted deformation is reduced and a torque transmission efficiency is increased since the torque is directly transmitted to the spool shaft 16 from the pinion gear 32 having a larger diameter than the spool shaft 16.

As shown in FIG. 2, the clutch lever 17 is disposed at the back of the spool 12 between the pair of the side plates 5a and 5b.

The clutch switching mechanism 19 includes a clutch yoke 40 as shown in FIG. 2. The clutch switching mechanism 19 is disposed at outer peripheral side of the spool shaft 16 and supported by two pins 41 (only one in shown in the figure) in a movable manner parallel to the axial center of the spool shaft 16. Also, the clutch yoke 40 includes an engaging portion 40a that engages with the compressed portion 32c of the pinion gear 32 at the center portion thereof. Moreover, a spring 42 is disposed at an outer periphery of each of the pins 41 for supporting the clutch yoke 40 between the clutch yoke 40 and the second side-cover 6b. The clutch yoke 40 is always urged towards inside by the spring 42.

In this configuration, the pinion gear 32 is located at an inner clutch engaging position in a normal state so that the engaging portion 32b is engaged with the engaging pin 16b of the spool shaft 16 to be a clutch-on state. On the other hand, when the pinion gear 32 is moved outwardly by the clutch yoke 40, the engaging portion 32b is disengaged from the engaging pin 16b to be a clutch-off state.

The drag mechanism 21 includes a drag washer 45 and a pressing plate 46. The main gear 31 presses the drag washer 45. The pressing plate 46 presses the drag washer 45 against the main gear 31 with a predetermined force by a rotational operation of the star drag 3.

The casting control mechanism 22 includes a plurality of drag washers 51 and a braking cap 52. The plurality of drag washers 51 is disposed so as to hold both ends of the spool shaft 16. The braking cap 52 adjusts a holding force of the drag washers 51 holding the spool shaft 16. The drag washer 51 at the left hand side is disposed in the brake case 65.

Centrifugal Braking Mechanism Configuration

As shown in FIGS. 3 and 5, the centrifugal braking mechanism 23 includes a brake element 68, a rotor 66, and a plurality (for instance, six) of shifters 67. The brake element 68 is fixed to the brake case 65. The rotor 66 is disposed at inner peripheral side of the brake element 68 so as to be concentric with the brake element and fixed to the spool shaft 16. The shifters 67 are attached to the rotor 66 in a movable manner in the radius direction.

The brake element 68 is a thin cylindrical member made of, for instance, copper alloy and fixed to an inner periphery surface of the brake case 65. The brake element 68 has a braking surface 68a of a cylindrical shape at the inner periphery surface thereof. The brake case 65 is a short cylindrical member having a bottom and a bearing accommodating portion 65a of a cylindrical shape which projects inwardly is formed on the inner bottom surface thereof. The bearing 24*b* for supporting the spool 16 is disposed at the inner peripheral side of the bearing accommodating portion 65*a* and the drag washer 51 of the casting control mechanism 22 is attached thereto.

The rotor 66 includes a boss portion 66*a*, a cylindrical portion 66*b*, and a circular plate portion 66*c*. The boss portion 66*a* is fixed to the spool shaft 16. The cylindrical portion 66*b* extends to an outer peripheral side of the bearing accommodating portion 65*a* from the boss portion 66*a*. The circular plate portion 66*c* has a thick ring shape and protrudes outwardly in the radius direction from an outer periphery surface of an extending end of the cylindrical portion 66*b*.

Figure 4:
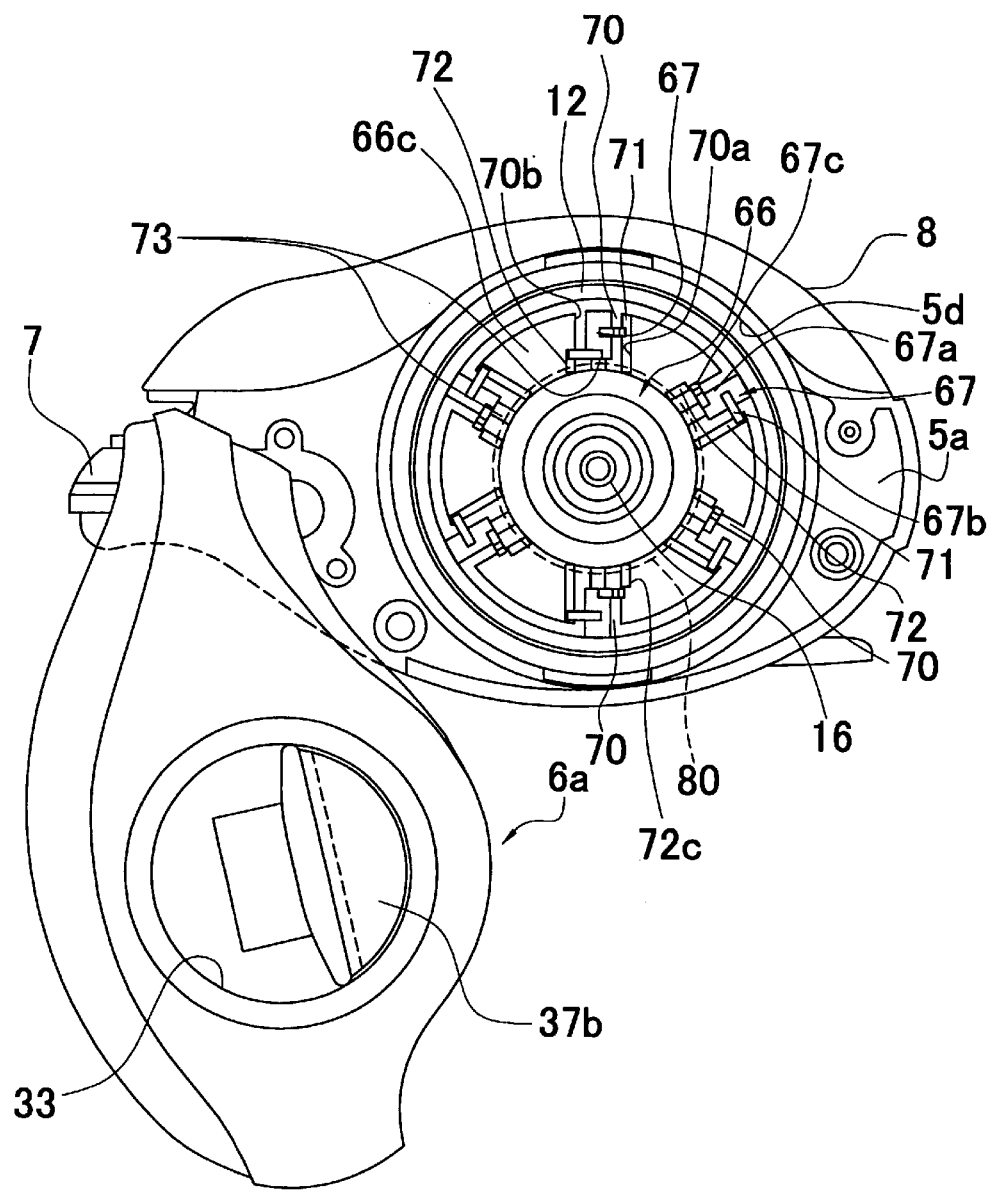
FIG. 4 is a side view when a first side cover is rotated.

As shown in FIG. 4, for instance, six, guide recesses 70 are formed at the outer periphery portion of the circular plate portion 66*c* with an equal space between each other in the circumferential direction. The guide recesses 70 accommodate the shifters 67 and switch the state of the shifters 67 to the operative state in which they may make contact with the brake element 68 from the inoperative state in which they cannot make contact with the brake element 68 or vice versa. A guide shaft 73 for guiding the respective shifter 67 is disposed at the bottom of the respective guide recess 70 radially in the radius direction. The shifter 67 is attached to the corresponding guide shaft 73 in a movable manner in the axial direction.

Figure 6A:
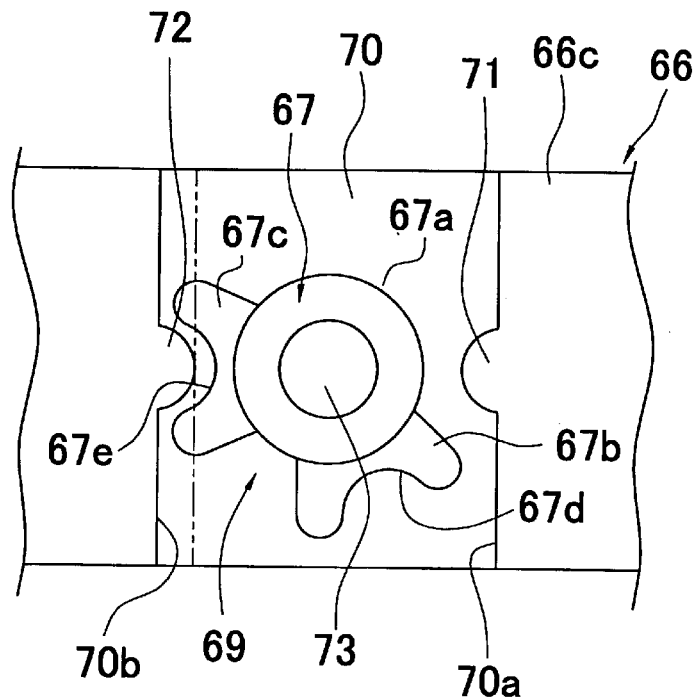
FIGS. 6A and 6B are enlarged plan views showing a switching of a state of a shifter.
Figure 6B:
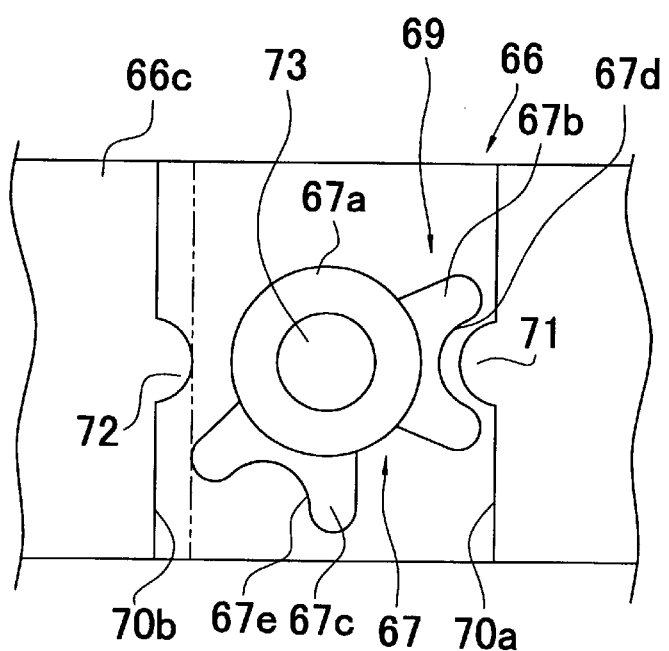

As shown in FIGS. 4 and 6A, first and second protuberant linear projections 71 and 72 are formed at wall surfaces 70*a* and 70*b*, which opposed to each other, of the guide recess 70. The first linear projection 71 is formed at the wall surface 70*a* located at the right hand side in FIG. 6 from the bottom portion of the guide recess 70 to its opening end. The first linear projection 71 is a guide which non-rotatably guides the shifter 67 in a movable manner in the axial direction to a position at which a contact with the brake element 68 is possible. The second linear projection 72 is formed at the wall surface 70*b* shown in the left hand side in FIG. 6A with a little length from the bottom of the guide recess 70. The second linear projection 72 is a restricter for restricting the shifter 67 not to make contact with the brake element 68. The second linear projection 72 has a length by which the shifter 67 cannot make contact with the brake element 68 and its end portion 72*c* at an outward side in the spool radius direction is closed at the same position as the end portion of the second linear projection 72. As a result, when a second shifter projection 67*c* (to be described later) is engaged with the second linear projection 72, the shifter 67 makes contact with the end portion 72*c* and cannot make contact with the brake element 68.

The shifters 67 are members of substantially a cylindrical shape made of a synthetic resin. The shifters 67 are attached to the guide shafts 73 in a slidable manner in the radius direction and make contact with the brake element 68 by a centrifugal force generated by the rotation of the spool 12. Each of the shifters 67 includes a main portion 67*a* of a cylindrical shape, a first shifter projection 67*b*, and the second shifter projection 67*c*. The guide shaft 73 guides the main portion 67*a*. The first shifter projection 67*b* is integrally formed with the main portion 67*a* at a middle portion thereof in the axial direction. The second shifter projection 67*c* is integrally formed with the main portion 67*a* at an inner side of its end portion in the axial direction. The shape of the first shifter projection 67*b* and that of the second shifter projection 67*c* are the same and they are disposed with an interval between each other in the axial direction and the circumferential direction. Both of the shifter projections 67*b* and 67*c* project outwardly in the radius direction from the main portion 67*a* so that they may be engaged with the first and the second linear projections 71 and 72 which are formed at the guide recess 70. Recessed engaging portions 67*d* and 67*e* which are engaged with the first and the second linear projections 71 and 72, respectively, are formed at end portions thereof. The length of the second linear projection 72 is adjusted so that it becomes longer than the thickness of the second shifter projection 67*c* and does not allow the shifter 67 make contact with the brake element 68. The switching mechanism 69 is formed by the linear projections 71 and 72 and shifter projections 67*b* and 67*c*.

When the first shifter projection 67*b* is engaged with the first linear projection 71 (FIG. 6B), the shifter 67 may make contact with the brake element 68 and this state is called the operative state. Also, when rotated around the guide shaft and the second shifter projection 67*c* is engaged with the second linear projection 72 (FIG. 6A), the shifter 67 is engaged with the end portion 72*c* of the second linear projection 72 and cannot make contact with the brake element 68. This state is the inoperative state. As mentioned above, the number of the shifters 67 that may make contact with the brake element 68 may be adjusted by switching the shifters 67 to the operative state or to the inoperative state. Also, since the state of the shifters 67 is switched by the rotation around the guide shaft, the state of the shifters 67 may be switched by using a direction different from the moving direction of the shifters 67 during a braking operation. For this reason, a large force is not required for a switching operation in the rotary direction and a switching operation may be carried out with a light force. Since the switching operation can be performed with a small force, each step of the switching operation may be carried out all at once by using another member instead of doing it manually one by one. Moreover, since the direction of the operation is the rotary direction and not the radius direction of the spool, the simultaneous operation is easy to carry out.

Braking Force Adjustment

When the braking force is adjusted, the opening 5*d* in the side plate 5*a* is exposed by opening the first side-cover 6*a*.

In order to open the first side-cover 6*a*, the operation knob 37*b* is firstly raised to enter an unlocking state from a locking state shown in FIG. 2. When the operation knob 37*b* is entered to the unlocking state, the locking member 38 is pushed by the operation knob 37*b* and moved to an unlocking position against an urging force of the coil spring 39. When the locking member 38 is moved to the unlocking state, its end portion is disengaged from the recess 33*b* of the opening 33 and the main portion 37*a* becomes rotatable.

When the operation knob 37*b* is rotated in this state, the brake case is rotated together with the main portion 37*a* as shown in FIG. 5 and the engagement between the screw portions 25 and 26 is disengaged to release the engagement between the brake case 65 and the side plate 5*a*. When the engagement between the brake case 65 and the side plate 5*a* is disengaged, the brake case 65 is moved outwardly together with the main portion 37*a* by the coil spring 44. Simultaneously, the first side-cover 6*a* supported by the pivoting mechanism 34 is moved in a direction away from the side plate 5*a*. When the brake case 65 is completely separated from the side surface of the side plate 5*a*, the first side-cover 6*a* is separated from the reel body 1 and pivoted to a releasing position shown in FIG. 4 around an axis of the pivoting mechanism 34 due to the weight itself. Accordingly, the opening 5*d* is exposed to outside and the rotary state of the shifters 67 may be easily confirmed by naked eyes. In FIG. 4, for instance, only the shifter at upper side are engaged with the second linear projection 72 and other shifters 67 are engaged with the first linear projection 71. Thus, only one of the shifters is in the inoperative state and other five shifters 67 are in the operative state. Since the states of shifters 67 are switched by rotating the shifters 67 in this manner, the two states may be determined immediately.

The adjustment of the brake element is carried out by, for example, pushing one of the shifter projections 67b and 67c with fingers so that the shifters 67 rotate around the guide shaft to switch to operative state or inoperative state. When the shifter 67 is rotated so that the first shifter projection 67b is directed to the first linear projection 71, the first shifter projection 67b is elastically deformed and engaged with the first linear projection 71. As a result, the shifter 67 enters the operative state and this state is maintained. Also, when the second shifter projection 67c is directed to the second linear projection 72, the second shifter projection 67c is elastically deformed and engaged with the second linear projection 72. As a result, the shifter 67 enters the inoperative state and this state is maintained.

When the adjustment of the braking force is completed, the first side-cover 6a is closed. At that time, the first side-cover 6a is manually rotated to a closing side and then the operation knob 37b is pushed to insert the brake case 65 in the opening 5d. The operation knob 37b is rotated in the tightening direction which is opposite to the releasing direction in a state in which the end portion of the brake case 65 is in contact so that the screw portions 25 and 26 are engaged. Then, the brake case 65 is coupled to the opening 5d. After that, the operation knob 37b is pivoted from the unlocking position to the locking position and the locking member is engaged with the recess 33b. In this manner, the first side-cover 6a is maintained in its closing state.

In this embodiment, since the state of the shifters 67 are switched by rotating the shifters 67, the state of the shifters 67 can be confirmed immediately. For this reason, the two states of the shifters 67 is easily determined and the braking force may be adjusted quickly. Also, since the state of the shifters 67 may be switched by using a direction different from the moving direction of the shifters 67 during a braking operation, a large force is not required for a switching operation in the rotary direction and the switching operation may be carried out with a small force.

Second Embodiment

In the embodiment just described the two states are switched between by manually pressing on the shifters 67 one by one. But a dual-bearing reel centrifugal braking device according to the present invention may be configured providing a shifter control mechanism 80 as shown in FIG. 8 that one by one enables shifters 167 to be switched in sets.

Figure 7:
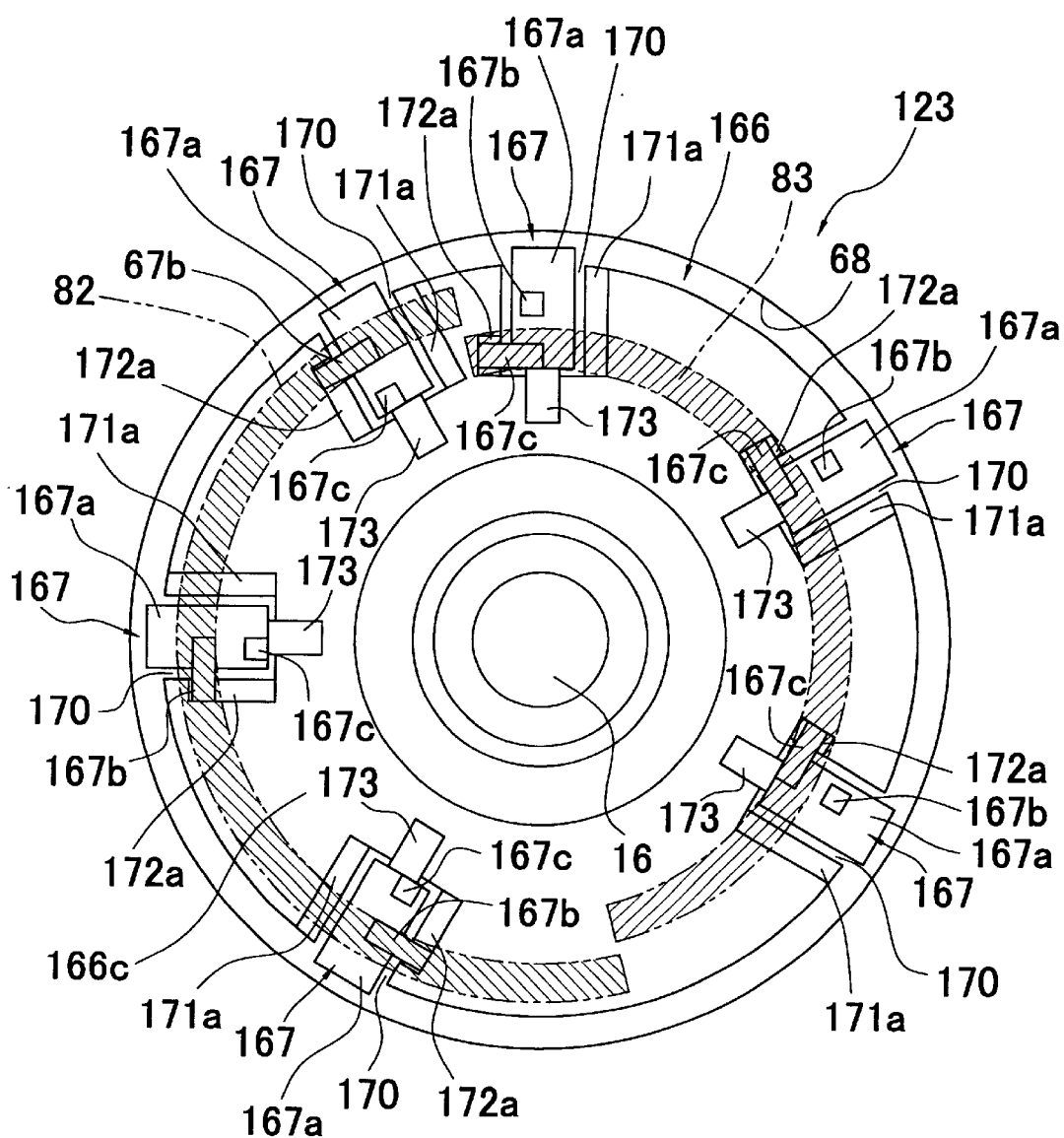
FIG. 7 is partial cross sectional view of a centrifugal braking mechanism according to a second embodiment.
Figure 8:
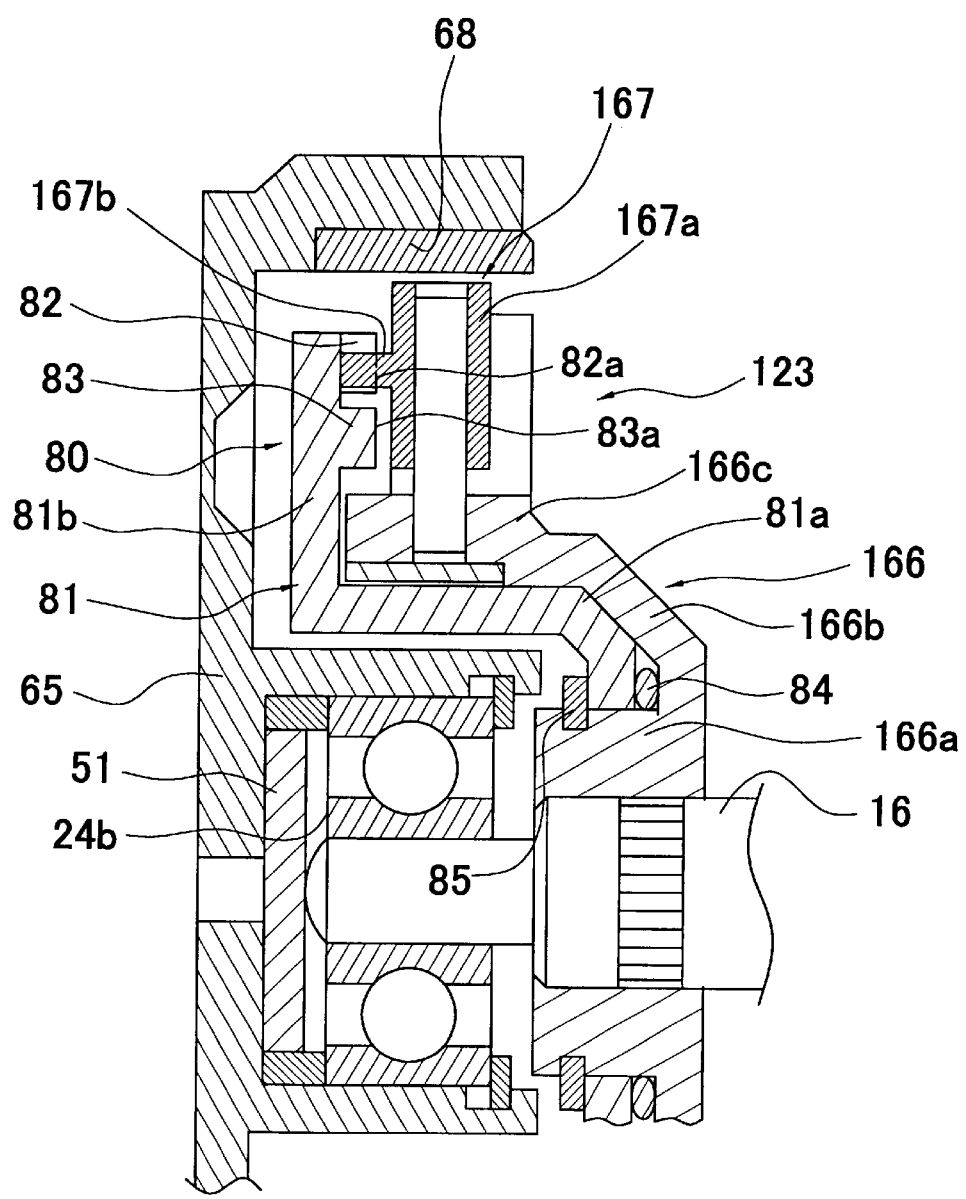
FIG. 8 is a front elevational view of a centrifugal braking mechanism according to the second embodiment.

In FIGS. 7 and 8, guide recesses 170 are arranged circumferentially spaced in the outer periphery of disk 166c on rotor 166, but are not as in the first embodiment arranged at even spacing. That is, from the guide recess 170 uppermost in the FIG. 7 rotor 166 clockwise among the total of six guide recesses 170 disposed, to the third guide recess 170, the recesses are arranged at a 60-degree spacing, for example; and the third guide recess 170 and fourth guide recess 170 are arranged at a 90-degree spacing. Further, the fourth through sixth guide recesses 170 are arranged at a 60-degree spacing. Arranging the guide recesses 170 to differ the spacing makes the timing at which the shifters 167 switch constant.

First channel notches 171a are formed in the corner of the clockwise, downstream-ward lateral wall of the guide recesses 170 and the outward face (lateral surface facing the brake case 65), and second channel notches 172a are formed in the upstream-ward corner. The first channel notches 171a are formed from the base of the guide recesses 170 to the ends opening on the rotor 166, and guide the shifters 167 for contact with the brake element 68. The second channel notches 172a are not formed as far as the open ends but are midway to them in length. Also, the length of the first through the third of the second channel notches 172 is shorter than that of the fourth through the sixth of the second channel notches 172. The reason for this will be explained in detail later.

The shifters 167 are members of substantially a cylindrical shape made of a synthetic resin. The shifters 167 are attached to the guide shafts 173 in a slidable manner in the radius direction and make contact with the brake element 68 by a centrifugal force generated by the rotation of the spool 12. Each of the shifters 167 includes a main portion 167a of a cylindrical shape, a first shifter projection 167b, and the second shifter projection 167c. The main portion 167a is guided by the guide shaft 173. The first shifter projection 167b is integrally formed with the main portion 167a at a middle portion thereof in the axial direction. The second shifter projection 167c is integrally formed with the main portion 167a at an inner side of its end portion in the axial direction. The shape of the first shifter projection 167b and that of the second shifter projection 167c are the same and they are disposed with an interval between each other in the axial and the circumferential directions. In addition, as shown in FIG. 9B there is a small interval between the first channel notch 171a and the shifter projections 167b and 167c so that the movement of the shifter 167 in the spool radius direction is made smooth when the shifter projections 167b and 167c are engaged with the first channel notch 171a.

In this embodiment, the shifters 167 attached to the first to the third guide recesses 170 and the shifters 167 attached to the fourth to the sixth guide recesses 170 have a structure in which the two shifter projections 167b and 167c are disposed as a mirror image relationship. The shifter projections 167b and 167c of the first to third shifters 167 project outwardly in the radius direction from the main portion 167a so that they may be engaged with the first and the second channel notches 171a and 172a, respectively. The shifter projections 167b and 167c of the fourth to sixth shifters 167 project outwardly in the radius direction from the main portion 167a so that they may be engaged with the second and the first channel notches 172a and 171a, respectively.

The reason why the length of the first to third second channel notches 172a is different from that of the fourth to six channel notches 172a is because the second shifter projection 167c which projects from an inside end portion of the main portion 167a in the axial direction engages with the first to third second channel notches 172a and the first shifter projection 167b which projects from a middle portion of the main portion 167a in the axial direction engages with the fourth to sixth second channel notches 172a. That is, since the first shifter projection 167b is disposed more outwardly in the radius direction with respect to the second shifter projection 167c, it is necessary to increase the length of the second channel notches 172a. In other words, the lengths are different so that the second shifter projection 167c is engaged with the first to third second channel notches 172a to prohibit a contact of the shifters 167 with the brake element 68 and that the first shifter projection 167b is engaged with the fourth to sixth second channel notches 172a to prohibit a contact of the shifters 167 with the brake element 68. The switching mechanism 169 is formed by the channel notches 171a and 172a and shifter projections 167b and 167c. In this embodiment, if one of the shifter projections 167b and 167c is engaged with one of the channel notches 171a and 172a, the state thereof is not maintained.

As shown in FIG. 8, the shifter controlling mechanism 80 includes an adjustment member 81, a first arc projection 82, and a second arc projection 83. The adjustment member 81 has a circular plate shape and is attached to the boss portion 66a of the rotor 166. The first arc projection 82 has a half arc shape and is formed at a side surface of the adjustment member 81 at a position capable of opposing to the first shifter projection 167b. The second arc projection 83 has a half arc shape and is formed at a position that is opposite to the first arc projection 82 and capable of opposing to the first shifter projection 167b.

The adjustment member 81 may relatively rotate around the spool shaft with respect to the rotor 166 and may rotate together with it while maintaining a relative rotary position. The adjustment member 81 is rotatably attached to the boss portion 166a and pressed against the cylindrical portion 166b by a snap ring 85 attached to the boss portion 166a via an O-ring 84. In this manner, the adjustment member 81 and the rotor 166 may rotate together as well as relatively rotate with respect to each other. The adjustment member 81 includes a tubular portion 81a and a circular plate portion 81b. The tubular portion 81a extends outwardly in the spool axis direction from the boss portion 166a along the cylindrical portion 166b. The circular plate portion 81b is disposed as to be opposed to the disk 166c from an outer periphery surface of an end portion of the tubular portion 81a. First and second arc projections 82 and 83 are formed on a side surface opposed to the disk 166c of the circular plate portion 81b so as to project towards the disk 166c.

Figure 9A:
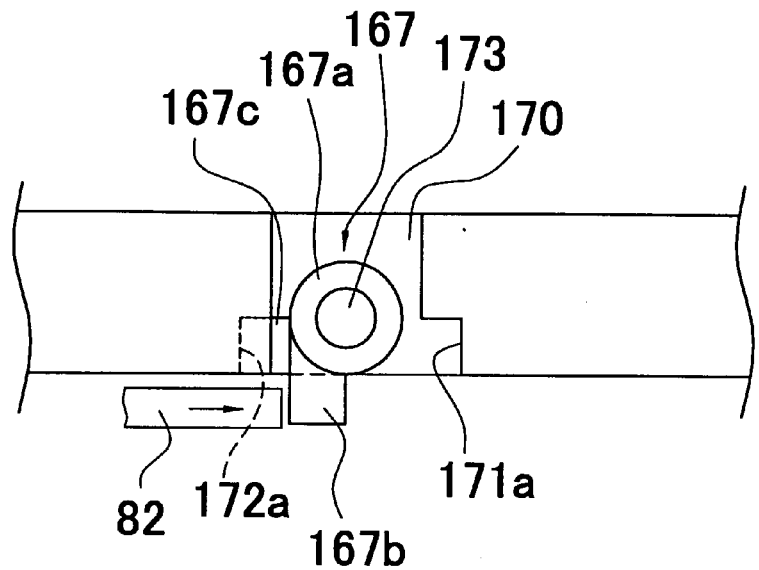
FIGS. 9A and 9B are diagrams corresponding to FIG. 6 showing the second embodiment.
Figure 9B:
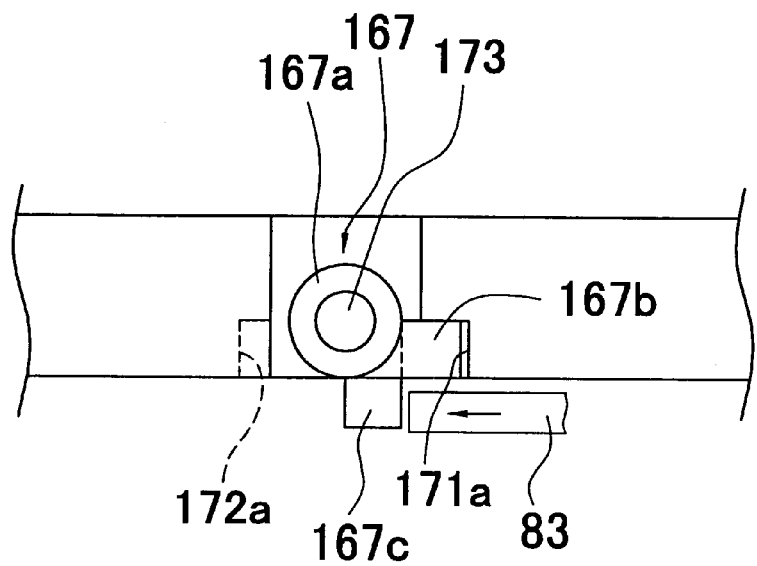

As shown in FIG. 9A, the first arc projection 82, when the shifters 167 are in their inoperative state, presses the three first shifter projections 167b of the first to the third guide recesses 170 in that order by an end portion thereof by the rotation of the adjustment member 81 in a clockwise direction in FIG. 7 so that the first shifter projections 167b are engaged, in that order, with the first channel notches 171a which are guides. In this manner, the state of the shifters 167 is switched from the inoperative state to the operative state and the operative state of the switched shifters 167 is maintained by restricting the first shifter projection 167b by an opposing surface 82a of the first arc projection 82.

Also, the first arc projection 82, when the shifters 167 are in their operative state, presses the three first shifter projections 167b of the sixth to the fourth guide recesses 170 in that order by another end portion thereof by the rotation of the adjustment member 81 in a counterclockwise direction in FIG. 7 so that the first shifter projections 167b are engaged, in that order, with the second channel notches 172a which are restricting portions. In this manner, the state of the shifters 167 is switched from the operative state to the inoperative state and the inoperative state of the switched shifters 167 is maintained by restricting the first shifter projection 167b by the opposing surface 82a.

Similar to the first arc projection 82, the second arc projection 83, when the shifters 167 are in their inoperative state, presses the three second shifter projections 167c of the fourth to the sixth guide recesses 170 in that order by an end portion thereof by the rotation of the adjustment member 81 in a clockwise direction in FIG. 7 so that the second shifter projections 167c are engaged, in that order, with the first channel notches 171a which are guides. In this manner, the state of the shifters 167 is switched from the inoperative state to the operative state and the operative state of the switched shifters 167 is maintained by restricting the second shifter projection 167c by an opposing surface 83a of the second arc projection 83.

Also, as shown in FIG. 9B, the second arc projection 82, when the shifters 167 are in their operative state, presses the three second shifter projections 167c of the third to the first guide recesses 170 in that order by another end portion thereof by the rotation of the adjustment member 81 in a counterclockwise direction in FIG. 7 so that the second shifter projections 167c are engaged, in that order, with the second channel notches 172a which are restricting portions. In this manner, the state of the shifters 167 is switched from the operative state to the inoperative state and the inoperative state of the switched shifters 167 is maintained by restricting the second shifter projection 167b by the opposing surface 83a.

In addition, the guide recesses 170 are disposed with different space between each other as mentioned above so that the timing of the first arc projection 82 presses the first shifter projections 167b of the first to the third shifters 167 is shifted about 30 degrees in phase angle from the timing of the second arc projection 82 presses the second shifter projections 167c of the fourth to the sixth shifters 167. As a result, the switching order from the inoperative state to the operative state becomes 1-4-2-5-3-6 and the switching order from the operative state to the inoperative state becomes 6-3-5-3-4-1 to achieve a switching operation of the shifters 167 while maintaining an excellent balance in a stepwise manner.

In the centrifugal braking mechanism 123 having the above mentioned structure, the state of the shifters 167 may be switched at once by, for instance, holding the spool 12 by his/her left hand while the first side-cover 6a is opened and rotating the adjustment member 81 by his/her right hand. After the switching operation, if the fist side-cover 6a is closed and cast, the adjustment member 81 rotates together with the spool 12 and the rotor 166, and the phase of the rotor 166 does not change. Accordingly, the state achieved after the switching operation is maintained. When the shifters 167 make contact with the brake element 68 by a centrifugal force, the spool 12 is braked by a braking force which corresponds to the number of the shifters 167 that make contact and, hence, backlash is unlikely to arise.

Third Embodiment

Although the switching operation of the shifters 167 and the maintenance of the state thereof are carried out by using the two arc projections 82 and 83 in the above second embodiment, the maintenance of the state is performed by the engagement of shifter projections with channel notches in the third embodiment. Since there is no need to maintain the state by using a side surface of the projection, scattered four control nubs are provided instead of the arc projections and only the switching operation of the state of the shifters 267 is carried out by the control nubs.

Figure 10:
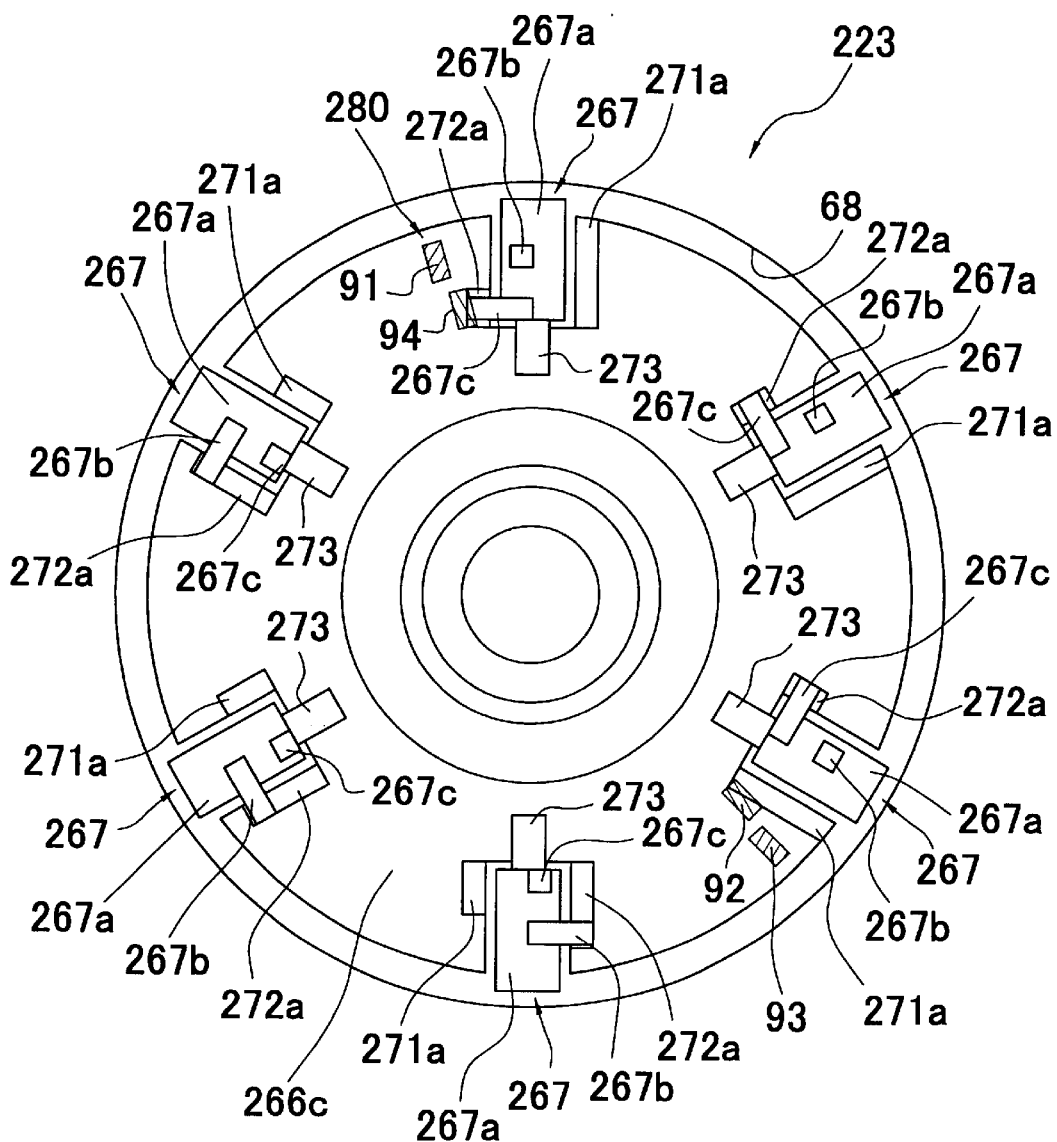
FIG. 10 is a diagram corresponding to FIG. 8 showing a third embodiment.
Figure 11A:
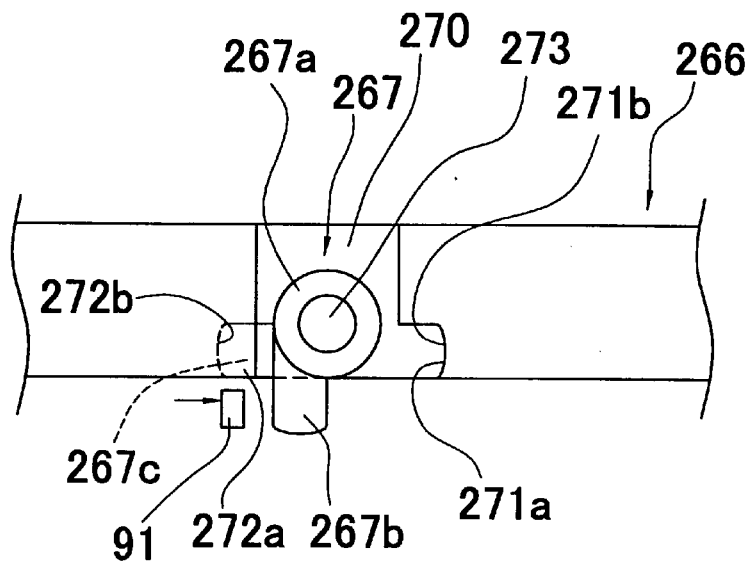
FIGS. 11A and 11B are diagrams corresponding to FIG. 6 showing the third embodiment.
Figure 11B:
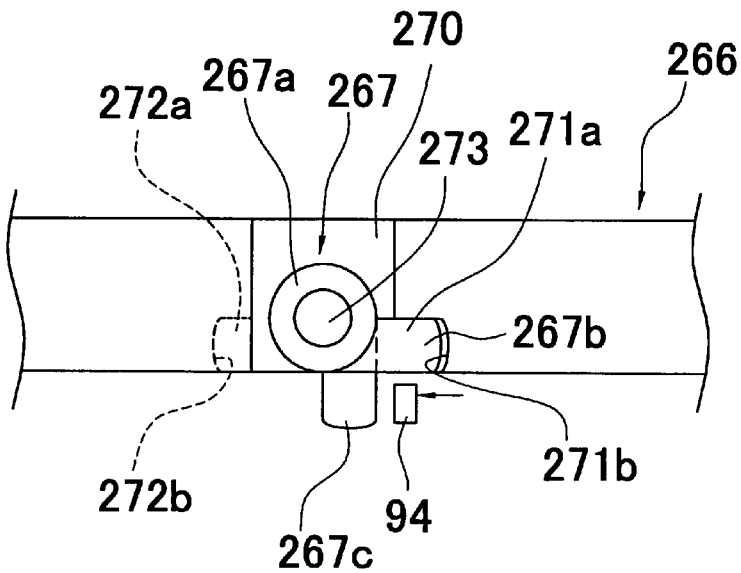

In FIGS. 10, 11A and 11B, the guide recesses 270 are disposed at an outer periphery portion of the circular plate portion 266c of the rotor 266 with an equal interval between each other. That is, a total of six guide recesses 270 are provided from the top of the rotor 66 in a clockwise direction, for instance, at a 60 degree angle for each other.

A first channel notch 271a is formed at a corner of a side wall of the guide recess 270 at a downstream side in a clockwise direction and an outer side surface (a side surface facing the brake case 65), and a second channel notch 272a is formed at a corner at an upstream side. The first channel notch 271a is formed from a bottom of the guide recess 270 to an opening end of the rotor 266 and guides the shifter 267 to the brake element 68 in a manner capable of making contact with it. The second channel notch 272a is not formed to the opening end and has a length of about half size. Also, the length of each of the first to the third second channel notches 272 is shorter than that of the fourth to the sixth second channel notches 272. The reason for this is the same as that described in the second embodiment. Contacting surfaces 271b and 272b of the channel notches 271a and 272a are slightly hollowed in order to maintain the states of the shifter projections 267b and 267c of the shifters 267.

The shifters 267 are members of substantially a cylindrical shape made of a synthetic resin and includes a main portion 267a of a cylindrical shape, a first shifter projection 267b, and the second shifter projection 267c, each of which has the same structure as described in the second embodiment. An end portion of each of the shifter projections 267b and 267c is rounded so as to fit to a hollow of the channel notches 271a and 272a. Due to the engagement of the round shape with the hollow and the fact that the shape of the end portion of the shifter projections 267b and 267c is not concentric with the pivoting axis of the shifters 267, the shifter projections 267b and 267c are engaged with the channel notches 271a and 272 a by utilizing the difference in the diameter and the elasticity thereof when pivoted and the state thereof is maintained. In this embodiment, also, the shifters 267 attached to the first to the third guide recesses 270 and the shifters 267 attached to the fourth to the sixth guide recesses 270 have a structure in which the two shifter projections 267b and 267c are disposed as a mirror image relationship. The shifter projections 67b and 67c of the first to the third shifters 267 protrude outwardly in the radius direction from the main portion 267a so that they may be engaged with the first and the second channel notches 271a and 272a, respectively. The shifter projections 267b and 267c of the fourth to the sixth shifters 267 protrude outwardly in the radius direction from the main portion 267a so that they may be engaged with the second and the first channel notches 272 a and 271a, respectively. In addition, as shown in FIG. 11B, there is a small interval between the first channel notch 271a and the shifter projections 67b and 67c so that the movement of the shifter 267 in the spool radius direction is made smooth when the shifter projections 267b and 267c are engaged with the first channel notch 271a.

The shifter controlling mechanism 280 includes an adjustment member 81 which has the same structure as in the second embodiment shown in FIG. 8 and first to fourth control nubs 91 to 94 which are formed on a side surface of the adjustment member 81.

The first control nub 91 is formed at a position at which it may oppose to the first shifter projection 267b. As shown in FIG. 11A, the first control nub 91, when the shifters 267 are in their inoperative state, presses the first shifter projections 267b of the first to the third guide recesses 270 in that order by the rotation of the adjustment member 81 in a clockwise direction so that the first shifter projections 267b are engaged, in that order, with the first channel notches 271a which are guides. In this manner, the state of the shifters 267 is switched from the inoperative state to the operative state. The operative state of the switched shifters 267 is maintained by engaging the first shifter projection 67b with the first channel notch 271a.

The second control nub 92 is disposed at a side surface of the adjustment member 81 at a position at which it may oppose to the second shifter projection 267c and which is located at an upper stream side in a clockwise direction with respect to a symmetrical position formed by the first control nub 91 and the spool shaft center. More specifically, the second control nub 92 is disposed at a 150 degrees angle with respect to the first control nub 91. The second control nub 92 presses the second shifter projections 267c of the fourth to the sixth guide recesses 270 in that order by the rotation of the adjustment member 81 in a clockwise direction so that the second shifter projections 267c are engaged, in that order, with the first channel notches 271a. In this manner, the state of the shifters 267 is switched from the inoperative state to the operative state. The operative state of the switched shifters 267 is maintained by engaging the second shifter projection 267c with the first channel notch 271a.

The third control nub 93 is disposed at a position located at a downstream side in a clockwise direction with respect to the second control nub 92 with the same radius position as the first control nub 91. The third control nub 93, when the shifters 267 are in their operative state, presses the first shifter projections 267b of the sixth to the fourth guide recesses 270 in that order by the rotation of the adjustment member 81 in a counterclockwise direction so that the first shifter projections 267b are engaged, in that order, with the second channel notches 272a. In this manner, the state of the shifters 267 is switched from the operative state to the inoperative state. The inoperative state of the switched shifters 267 is maintained by engaging the first shifter projection 267b with the second channel notch 272a.

The fourth control nub 94 is disposed at a position located at a downstream side in a clockwise direction with respect to the first control nub 91 with the same radius position as the second control nub 92. The fourth control nub 94 is disposed at a 150 degrees angle with respect to the third control nub 93. As shown in FIG. 11B, the fourth control nub 94 presses the second shifter projections 267c of the third to the first guide recesses 270 in that order by another end portion thereof by the rotation of the adjustment member 81 in a counterclockwise direction so that the second shifter projections 267c are engaged, in that order, with the second channel notches 272a. In this manner, the state of the shifters 267 is switched from the operative state to the inoperative state. The inoperative state of the switched shifters 267 is maintained by engaging the second shifter projection 267c with the second channel notch 272a.

In addition, the guide recesses 270 are disposed with equal spaces between each other as mentioned above and the first control nub 91 and the second control nub 92, the third control nub 93 and the fourth control nub 94 are disposed at a 150 degrees angle with each other so that the timing of the first control nub 91 presses the first shifter projections 267b of the first to the third shifters 267 is shifted 30 degrees in phase angle from the timing of the second control nub 92 presses the second shifter projections 267c of the fourth to the sixth shifters 267. As a result, the switching order from the inoperative state to the operative state becomes 1-4-2-5-3-6 and the switching order from the operative state to the inoperative state becomes 6-3-5-3-4-1 to achieve a switching operation of the shifters 267 while maintaining an excellent balance in a stepwise manner. Also, since the guide recesses 270 are disposed with the same interval between each other maintaining an excellent balance, the balance of rotation is not easily disturbed.

In the centrifugal braking mechanism 223 having the above mentioned structure, the state of the shifters 267 may be switched at once by, for instance, holding the spool by his/her left hand while the first side-cover 6a is opened and rotating the adjustment member 81 by his/her right hand. After the switching operation, if the fist side-cover 6a is closed and cast, the adjustment member 81 rotates together with the spool 12 and the rotor 266, and the phase of the rotor 266 does not change. Accordingly, the state achieved after the switching operation is maintained. When the shifters 267 make contact with the brake element 68 by a centrifugal force, the spool 12 is braked by a braking force which corresponds to the number of the shifters 267 that make contact with the brake element 68 and, hence, backlash is not liable to occur.

Other Embodiments (a) Although a projecting portion of the shifters is engaged with the guide recess which is disposed at a side wall of the rotor in the previous three embodiment, the present invention is not limited to this structure. For instance, the guide shafts may be formed by rod-shape members having different cross sectional shapes so that the shifters can move in the guide shaft direction only when a certain rotational phase appears and then, when rotates, the shifters are elastically deformed to be engaged with the guide shaft.

(b) Although the first and the second linear projections 71 and 72 are provided with the guide recess 70 and the recessed engaging portion 67d and 67e are provided with the first and the second shifter projections 67b and 67c of the shifters 67 in the above first embodiment, a linear channel notch may be provided in the guide recess and a protuberant portion which is engaged with the linear channel notch may be provided with the shifters.

Figure 12A:
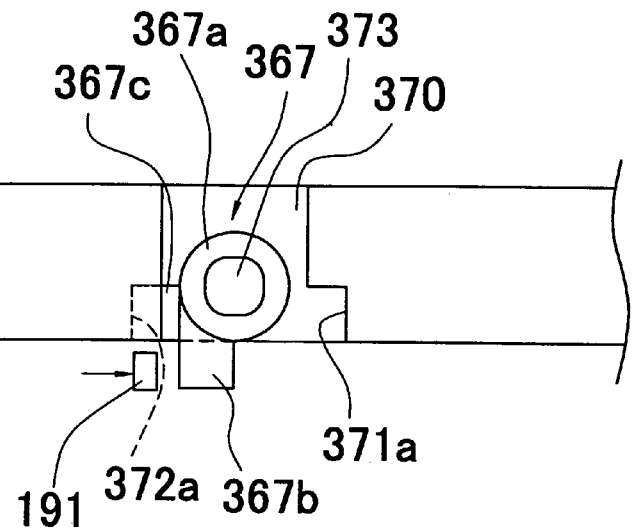
FIGS. 12A and 12B are diagrams corresponding to FIG. 6 showing a modification of the third embodiment.
Figure 12B:
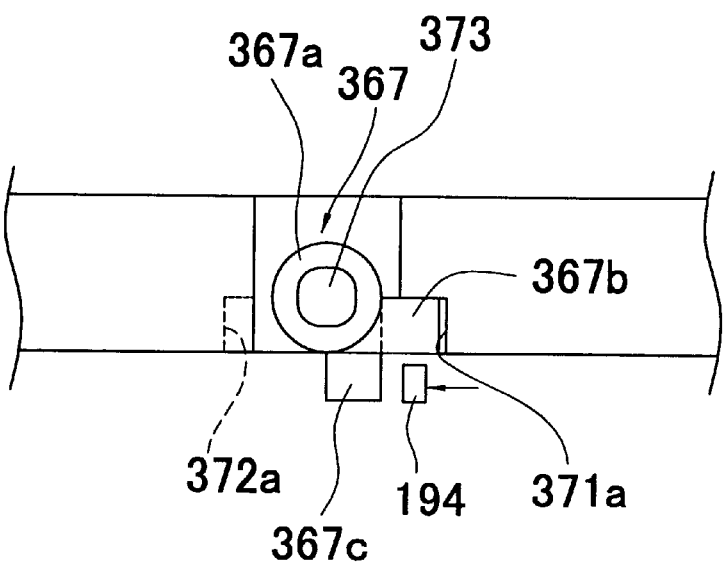

(c) Although the state of the shifter 267 is maintained by the dovetailing engagement of the channel notches 271a and 272a with the shifter projections 267b and 267c in the above third embodiment, the operative state and the inoperative state may be maintained by the guide shafts 373. For instance, as shown in FIGS. 12A and 12B, the guide shafts 373 may be formed by using a rod-shape member having a foursided figure cross section so that the shifter 367 is difficult to be pivoted but may be pivoted by being pressed by the control nubs 191–194.

According to the present invention, a switching operation may be carried out by changing a rotational position of the shifter around the guide shaft. Since the rotational direction around the guide shaft is different from the moving direction of the shifter (i.e., the axial direction of the guide shaft), a large force is not necessary for the switching operation in the rotary direction and the operation may be carried out by using a small force. Since the switching operation may be carried out with a small force, it may be performed all at once by using another member instead of performing it one by one manually. Moreover, since the operation direction is the rotary direction, not the radius direction of the spool, the switching operation is easily performed all at once.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. In a dual-bearing reel unit rotatively carrying a spool on its rotary shaft, wherein a rotor is coupled to the spool for rotation together therewith, a centrifugal braking device for braking the spool under centrifugal force, the dual-bearing reel centrifugal braking device comprising:

a plurality of guide shafts disposed radially on the rotor;

a plurality of shifters fitted to said guide shafts to allow axial shift thereon and to be pivotable around the shafts, therein for shifting diametrically with respect to the spool;

a cylindrical brake element disposed non-rotatably with respect to the reel unit and outer-peripheral endwise of said plurality of shifters, for contact with said shifters when shifted spool-diametrically; and a switching means for translating said shifters around the shafts into different rotary positions to switch said shifters between an inoperative state wherein contact on said brake element is not possible and an operative state wherein contact is possible.

2. A dual-bearing reel centrifugal braking device as set forth in claim 1, said guide shafts each being stood inside a plurality of respective recesses formed in a radial pattern outer-marginally in the rotor and opening on its outer circumferential side; wherein said switching means includes:

shifter projections formed on said shifters and projecting diametrically with respect to said guide shafts;

guides provided unilaterally on first of rotationally opposing lateral walls of said recesses, for engaging with said shifter projections and non-rotatably, axially movably guiding said shifters to a position for contact with said brake element; and restricters provided unilaterally on second of said lateral walls, for engaging with said shifter projections and restricting said shifters from being able to come into contact with said brake element.

3. A dual-bearing reel centrifugal braking device as set forth in claim 2, wherein:

said guides include first linear engagements extending parallel to said guide shafts along the first lateral walls, to a length at which said shifters with said shifter projections being engaged can come into contact with said brake element;

said restricters include second linear engagements extending parallel to said guide shafts along the second lateral walls, to length at which said shifters with said shifter projections being engaged cannot come into contact with said brake element in a state in which said shifter projection being engaged; and said shifter projections endwise include shifter engagements for non-rotatably, axially movably engaging with the two linear engagements.

4. A dual-bearing reel centrifugal braking device as set forth in claim 3, wherein said first linear engagements are formed as protuberances on the first lateral walls of said recesses;

said second engagements are formed as protuberances on the second lateral walls of said recesses; and said shifter engagements are formed as notches endwise in said shifter projections.

5. A dual-bearing reel centrifugal braking device as set forth in claim 3, wherein said first linear engagements are formed as notches in the first lateral walls of said recesses;

said second linear engagements are formed as notches in the second lateral walls of said recesses; and said shifter engagements are formed as protuberances endwise on said shifter projections.

6. A dual-bearing reel centrifugal braking device as set forth in claim 3, said shifter projections being provided as couplets pivotally spaced around the guide shafts, wherein:

first of said shifter projections are for engaging with said first linear engagements; and second of said shifter projections are for engaging with said second linear engagements.

7. A dual-bearing reel centrifugal braking device as set forth in claim 6, said shifter projections couplets being disposed axially spaced with respect to said guide shaft, wherein:

the first of said shifter projections are nearer said brake element, therein for engaging with said first linear engagements; and the second of said shifter projections are farther from said brake element, therein for engaging with said second linear engagements.

8. A dual-bearing reel centrifugal braking device as set forth in claim 6, said shifter projections couplets being disposed axially spaced with respect to said guide shaft, wherein:

the second of said shifter projections are nearer said brake element, therein for engaging with said second linear engagements; and the first of said shifter projections are farther from said brake element, therein for engaging with said first linear engagements.

9. A dual-bearing reel centrifugal braking device as set forth in claim 1, said guide shafts each being stood inside an even number of respective recesses formed in a radial pattern outer-marginally in the rotor and opening on its outer circumferential side; wherein said switching means includes:

first shifter projections formed on said shifters and projecting diametrically with respect to said guide shafts;

second shifter projections disposed axially inward with respect to and pivotally spaced around said guide shafts;

guides provided unilaterally on first of rotationally opposing pairs of lateral walls of the even number of recesses, said guides in a continuous half being for engaging with said first shifter projections meanwhile said guides in the remaining half being for engaging with said second shifter projections, said guide guides axially movably guiding said shifters to a position for contact with said brake element; and restricters provided unilaterally on second of said lateral walls, said restricters in said continuous half being for engaging with said second shifter projections meanwhile said restricters in the remaining half being for engaging with said first shifter projections, said restricters therein for restricting said shifters from being able to come into contact with said brake element.

10. A dual-bearing reel centrifugal braking device as set forth in claim 9, wherein said guides include first channel notches formed in the first lateral walls, parallel to said guide shafts; and said restricters include second channel notches formed in the second lateral walls, parallel to said guide shafts, and having length by which said shifters cannot contact said brake element when said first shifter projections or said second shifter projections are abutted endwise therein.

11. A dual-bearing reel centrifugal braking device as set forth in claim 9, further comprising a shifter controlling mechanism which includes:

a disk-shaped adjustment member allowed to turn relative to said rotor about the rotary shaft of said spool, and enabled to maintain relative turning position and rotate unitarily with said rotor;

a first arcuate ridge provided on said adjustment member to be semi-arcuate in a position for opposing said first shifter projections, wherein said adjustment member rotating in one of its two rotational directions presses said first arcuate ridge on said first shifter projections endwise in order in that plurality thereof disposed in the recesses of the continuous half and engages in the pressing order said first shifter projections with said guides, thereby switching said shifters from the inoperative state to the operative state and maintaining the switched said shifters in the operative state, and said adjustment member rotating in the other of its two rotational directions presses said first arcuate ridge on said first shifter projections endwise in order in those disposed in the recesses of the remaining half and engages in the pressing order said first shifter projections with said restricters, thereby switching said shifters from the operative state to the inoperative state and maintaining the switched said shifters in the inoperative state; and a second arcuate ridge provided on said adjustment member contrariwise to said first arcuate ridge, to be semi-arcuate in a position for opposing said second shifter projections, wherein said adjustment member rotating in the one of its two rotational directions presses said second arcuate ridge on said second shifter projections endwise in order in those disposed in the recesses of the remaining half and turns said shifters in one of its two rotational directions about said guide shafts, engaging in the pressing order said second shifter projections with said guides, thereby switching said shifters from the inoperative state to the operative state and maintaining the switched said shifters in the operative state, and said adjustment member rotating in the other of its two rotational directions presses said second arcuate ridge on said second shifter projections endwise in order in those disposed in the recesses of the continuous half and turns said shifters in the other of its two rotational directions, engaging in the pressing order said second shifter projections with said restricters, thereby switching said shifters from the operative state to the inoperative state and maintaining the switched said shifters in the inoperative state.

12. A dual-bearing reel centrifugal braking device as set forth in claim 9, said guides and restricters wherein maintain engaged said shifters to be non-rotatable about said guide shafts.

13. A dual-bearing reel centrifugal braking device as set forth in claim 12, wherein said recesses are arranged outer-marginally in the rotor at circumferentially equal spacing; the centrifugal braking device further comprising a shifter controlling mechanism including:

an adjustment member allowed to turn relative to said rotor about the rotary shaft of said spool, and enabled to maintain relative turning position and rotate unitarily with said rotor;

a first control nub provided protruding in a position on said adjustment member for opposing said first shifter projections, wherein said adjustment member rotating in one of its two rotational directions presses said first control nub in order against said first shifter projections disposed in the recesses of the continuous half and engages in the pressing order said first shifter projections with said guides;

a second control nub provided on said adjustment member upstream-ward in the one rotational direction from the position of diametrical symmetry astride the spool axis from said first control nub, said second control nub therein for opposing said second shifter projections, wherein said adjustment member rotating in the one direction presses said second control nub in order against said second shifter projections disposed in the recesses of the remaining half and engages in the pressing order said second shifter projections with said guides;

a third control nub provided on said adjustment member in the same radial position as said first control nub and downstream-ward in the one direction from said second control nub, wherein said adjustment member rotating in the other of its two rotational directions presses said third control nub in order against said first shifter projections disposed in the recesses of the remaining half and engages in the pressing order said first shifter projections with said restricters; and a fourth control nub provided on said adjustment member in the same radial position as said second control nub and downstream-ward in the one direction from said first control nub, wherein said adjustment member rotating in the other direction presses said fourth control nub in order against said second shifter projections disposed in the recesses of the continuous half and engages in the pressing order said second shifter projections with said restricters.

* * * * *